May 30, 1939. M. E. REAGAN Re. 21,104

CARRIER RELAYING SYSTEM WITH LATCHED RECEIVER

Original Filed May 2, 1936 2 Sheets-Sheet 1

WITNESSES:

Wm. B. Sellers

INVENTOR

Maurice E. Reagan.

BY O. B. Buchanan

ATTORNEY

May 30, 1939. M. E. REAGAN Re. 21,104

CARRIER RELAYING SYSTEM WITH LATCHED RECEIVER

Original Filed May 2, 1936 2 Sheets-Sheet 2

WITNESSES:

Wm. B. Sellers

INVENTOR

Maurice E. Reagan.

BY O. B. Buchanan

ATTORNEY

Reissued May 30, 1939

Re. 21,104

UNITED STATES PATENT OFFICE 21,104

CARRIER RELAYING SYSTEM WITH LATCHED RECEIVER

Maurice E. Reagan, Wilkinsburg, Pa., assignor to Westinghouse Electric & Manufacturing Company, East Pittsburgh, Pa., a corporation of Pennsylvania Original No. 2,144,508, dated January 17, 1939, Serial No. 77,531, May 2, 1936. Application for reissue March 31, 1939, Serial No. 265,231

43 Claims. (Cl. 175—294)

Figure 1:
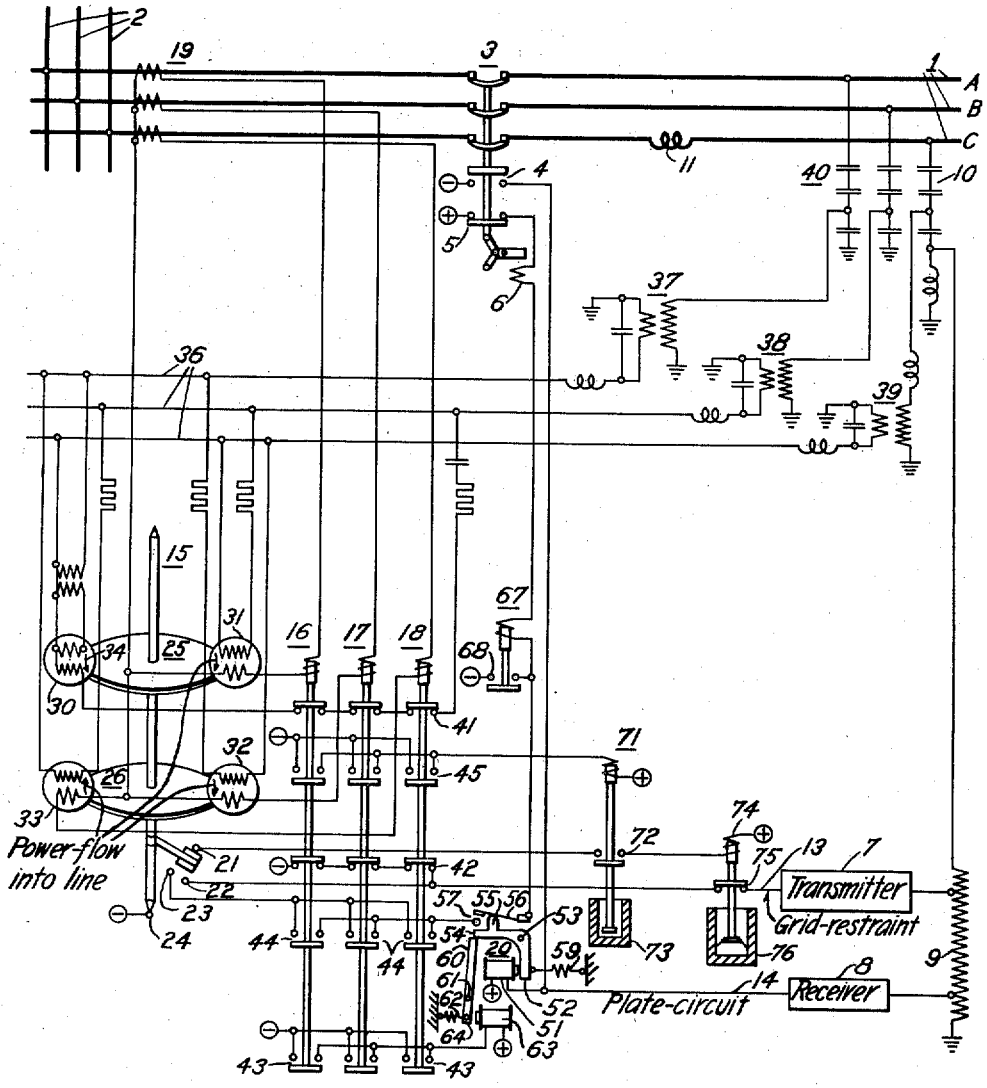

My invention relates to improvements in protective relaying systems such as are utilized for sectionalizing transmission lines in order to clear faults thereon, and it has particular relation to such a system utilizing a mechanically latched receiver-relay, for responding to a carrier current which is superimposed on the transmission system from either end of the protected line-section, or for responding to a signalling current which is otherwise transmitted from either end of the protected line-section, as over separate pilot wires.

There have been several types of carrier-current protective systems utilized or proposed for transmission lines prior to my present invention, including a carrier system transmitting on alternate half-waves of the power current, a so-called intermittent carrier system, a so-called continuous carrier system, and a carrier system utilizing a receiver-relay which is normally energized from a local circuit. All of these prior systems have certain drawbacks which it is my aim to overcome in my present invention. Thus, the principal drawback of the alternate-half-wave carrier system is probably the one which arises from the variable phase-angle displacement in the power-current between the two ends of the protected line-section, although there are many other drawbacks to this particular system. The intermittent carrier system depends, for its operation, on the initiation of the carrier-current transmission in response to an external fault, indicated at one end of the protected line-section, and the picking up of a carrier-current receiver-relay at the other end of the line-section in order to prevent faulty tripping at the second-mentioned end of the line-section, thereby involving the very serious drawback of requiring that the fault-responsive equipment at the second-mentioned end must be slowed down so as to allow for a time interval which may be of the order of 4 cycles, on a 60-cycle system, in order to allow sufficient time for the receiver-relay to pick up before the local fault-responsive relay picks up, thereby slowing down the entire fault-clearing operation by that much time. The principal drawback against the continuous carrier-current relaying system is the necessity for continuously transmitting the carrier current. The carrier-current protective system utilizing a receiver-relay which is normally energized from a local source of power, with means for switching control to the carrier current at times of fault, combines some advantages of the intermittent and continuous carrier systems, in that it avoids most of the time-delay of the intermittent system, and it avoids the necessity for continuously transmitting carrier, as in the continuous system, but it involves a certain time-delay incident to the collapsing of the magnetic field of the normally energized coil of the receiver-relay, and it involves a certain inflexibility, due to its multiple functions and its coil-construction, which somewhat limit its design-possibilities. A further drawback of the locally energized receiver relay is that it interposes a continuous drain on the local source of supply for energizing either the main coil or an auxiliary coil of the receiver-relay.

The principal object of my invention is to provide a mechanically latched receiver-relay which is normally latched in its actuated position and which is provided with an electrically responsive means for unlatching the same under certain fault-conditions, in combination with suitable fault-responsive relaying means, and equipment for transmitting and receiving carrier-current, constituting a protective system for a transmission line.

A more specific object of my invention is to provide an intermittent-carrier protective system utilizing a mechanically latched receiver-relay, with the sequence of operations so controlled that carrier-current is quickly superimposed on the protected line-section in response to a fault-indication, and subsequently the receiver-relay is unlatched and a determination of the direction of current-flow is made, the carrier-current being removed if the current-flow is into the protected line-section.

Another object of my invention is to provide an intermittent-carrier protective system utilizing a receiver-relay of a type which is normally held in an actuated position by means other than the carrier-current, with controlling means for superimposing carrier-current on the protected line-section only in the event of an external fault, as indicated by a fault-condition accompanied by current-flow out of the protected line-section.

A further object of my invention is to provide a protective relaying system utilizing instantaneous internal-fault and external-fault directional elements in a novel control system affecting circuit breakers and carrier-current.

A further object of my invention is to provide a novel form of self-resetting, mechanically latched relay suitable for use as a receiver-relay in a carrier-current protective system, and a novel protective system utilizing such a relay.

A still further object is to provide a carrier-current protective relaying system of the mechanically latched receiver-relay type, having means for affording protection against sudden power-reversal.

Figure 2:
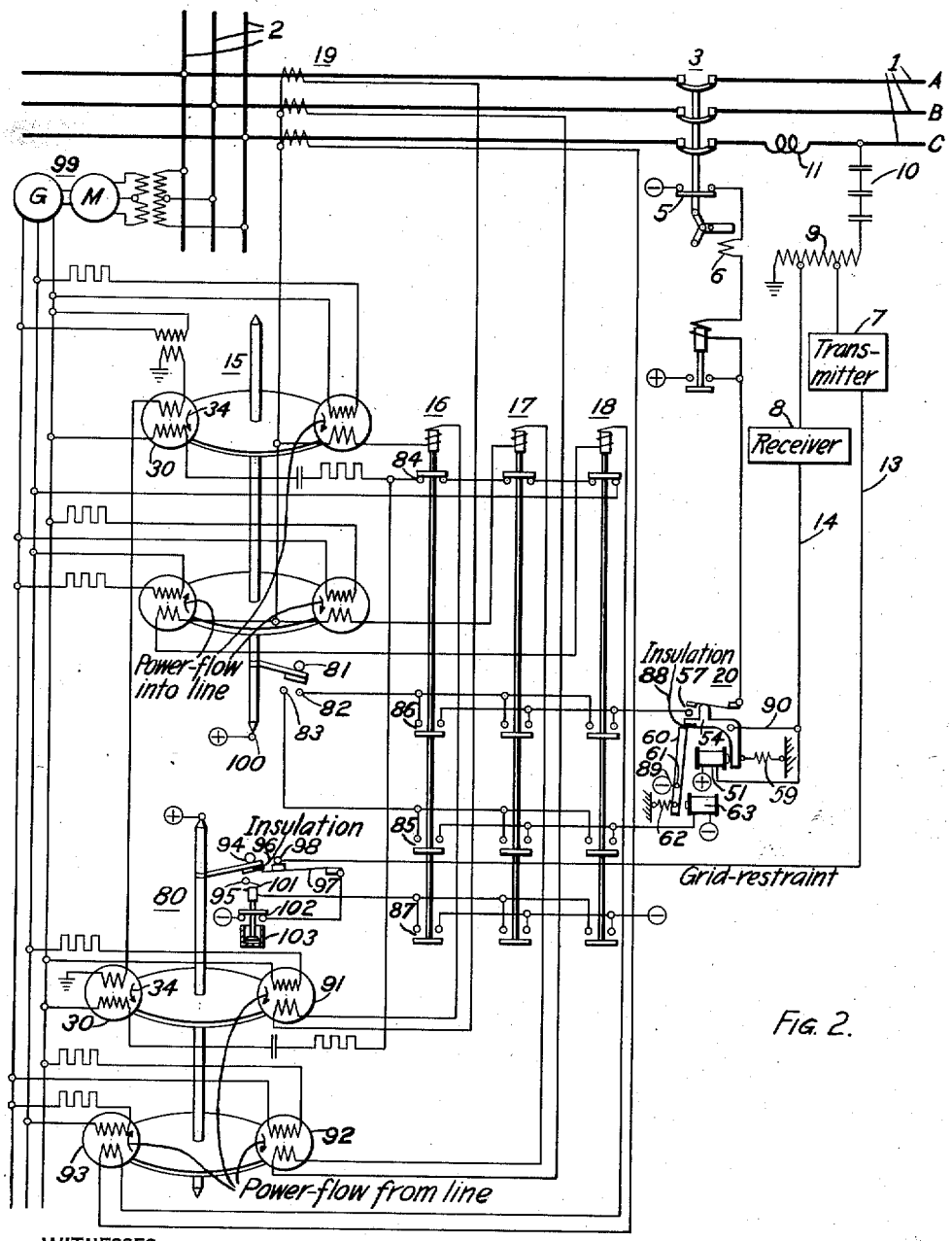

With the foregoing and other objects in view, my invention consists in the systems, apparatus, combinations, and methods hereinafter described and claimed and illustrated in the accompanying drawings, wherein Figs. 1 and 2 are diagrammatic views of circuits and apparatus embodying my invention in two different illustrative preferred forms.

I have illustrated my invention as being applied to the protection of a section of a three-phase transmission line 1, the three phases being designated by the letters A, B and C. Only one end of the protected line-section is shown, since the equipment at the other end is a duplicate of the equipment at the illustrated end. The transmission line is regarded as extending out from a bus 2 at the relaying station, and as being connected to said bus by means of a quick-acting circuit breaker 3. As shown in Fig. 1, the circuit breaker is provided with an auxiliary back-contact 4 which is closed when the circuit breaker is open, an auxiliary make-contact 5 which is closed when the circuit breaker is closed, and a trip coil 6 which serves to open the circuit breaker.

My protective system utilizes a pilot or communicating channel between the two ends of the protected line-section, whereby signals or intelligence may be transmitted from one end of the section to the other, for relaying purposes. Such pilot channel may consist of any suitable electric-communicating means, such as a high-frequency circuit for carrier currents which are superimposed upon the protected line at one end of the section, and which are received therefrom at both ends or at only the far end of the protected line-section. While I have illustrated a pilot channel utilizing these superimposed carrier currents of high frequency, it should be understood that such illustration is symbolic of any suitable pilot channel between the two ends of the protected line-section.

As shown in the drawings, a carrier-current transmitter is indicated by a rectangle 7, and a carrier-current receiver is indicated by a rectangle 8, the same being coupled, as by a transformer 9 and coupling capacitors 10, to phase C of the line 1. An impedance is interposed, against the flow of carrier-current back toward the bus 2, by means of a choke-coil 11 which is interposed in the phase-C conductor between the coupling capacitor 10 and the bus 2. The carrier-current transmitter 7 is provided with a grid-restraint circuit 13 which blocks transmission whenever it is closed. The carrier-current receiver 8 is provided with a plate-circuit 14 which is energized whenever the receiver is properly energized by a transmitted carrier current of the frequency to which it is tuned, said receiver being tuned, at least to the same frequency as the transmitter at the other end of the protected line-section, and preferably it is tuned to receive from the transmitters at both ends, both transmitters having the same frequency.

My protective relaying system utilizes any suitable quick-acting directional element 15, which is responsive to power-frequency current-flow into the protected line-section 1; any suitable quick-acting foul-responsive element or elements which are illustrated, in a simple form, as consisting of three separate overcurrent relays 16, 17 and 18, which are energized from the respective phases A, B and C through current-transformers 19, although other, more elaborate fault-responsive means are sometimes required, as is well known in the art; and a mechanically latched, quick-acting receiver-relay 20.

The directional element 15 is illustrated as being of the same type shown in a patent of Roy M. Smith, No. 2,005,172, granted June 18, 1935. The directional element shown in Fig. 1 comprises a movable element having a normally closed back-contact 21, and two normally open front-contacts 22 and 23, the movable element being connected, at 24, to the negative bus (—). The operating forces of the relay are applied to two discs 25 and 26, which are operated upon by four wattmeter elements 30, 31, 32 and 33, of which the element 30 is a so-called voltage-restraint element which normally exerts a restraining torque, as indicated by the arrow 34, tending to hold the movable element of the relay back against the back-contact, so that the back-contact 21 is closed. The voltage-restraint element 30 is energized from a suitable line-voltage-responsive potential-bus 36 which is energized from potential networks 37, 38 and 39, which are shown as being energized from the transmission line 1 through capacitor potentiometers 40. The three wattmetric elements 31, 32 and 33 are directional elements, responsive to the three phases of the line-current and voltage, for developing an operating torque, as indicated by the arrows, tending to open the back-contact 21 and close the front-contacts 22 and 23 when power-current, particularly power-current of fault-magnitude and phase, is flowing away from the bus 2 and into the line-section 1 which is being protected.

The overcurrent relays 16, 17 and 18, which I utilize as fault-detectors in the system which I have illustrated in Fig. 1, are each provided with two sets of back-contacts 41 and 42; and three sets of front- or make-contacts 43, 44 and 45. While these various sets of contacts are shown, for simplicity, as being carried by a single set of fault-responsive relays, it will be readily understood that certain of the contacts may be carried by relays of different distance-settings, as is well known in the art.

The mechanically latched receiver-relay 20 is illustrated in Fig. 1 in a form which has been previously developed and successfully used in supervisory-control systems. It comprises an operating coil 51 which attracts an armature 52 carried by a pivoted member which is pivoted at 53 and which terminates in an arm 54 carrying a bumper 55 which presses against a spring switch-arm 56 so as to open the receiver-relay back-contacts 57 when the receiver relay is in its actuated position. The movable armature element of the receiver-relay is normally biased toward its non-actuated position by means of a spring 59, but it is normally latched in its operated position by means of a pivoted latch-member 60 which is pivoted at 61 and which is normally biased toward its latching position by means of a spring 62. The latching member 60 is actuated to unlatch the receiver relay 20, by means of an unlatching coil 63 which serves to attract an armature 64 carried by the latching lever 60.

The circuit connections between the various elements of my system are dependent upon the operation of the fault-detector means such as the overcurrent relays 16, 17 and 18. The back-contacts 41 of the three overcurrent relays are connected in series with each other, and in series with one of the operating coils of the voltage-restraint element 30 of the directional element 15, so that the voltage-responsive restraint is quickly removed from the directional element 15 as soon as any one of the fault-responsive overcurrent relays 16, 17 and 18 picks up sufficiently to open its back-contact 41.

The back-contacts 42 of the overcurrent relays 16, 17 and 18 are all connected in series with each other, and in series with the grid-restraint circuit 13 of the carrier-current transmitter 7, thereby opening this grid-restraint circuit, and causing the instantaneous transmission of carrier as soon as any one of the fault-responsive overcurrent relays 16, 17 or 18 picks up sufficiently to open its back-contact 42.

The front-contacts 43 of the overcurrent relays 16, 17 and 18 are connected in parallel to each other and in series with the unlatching coil 63 of the receiver-relay 20, so that the receiver-relay is unlatched whenever one of the overcurrent relays is actuated far enough to close its make-contact 43. It will be noted that, before this contact 43 is made, the overcurrent-relay back-contact 42 is broken, causing carrier current to be supplied to the communicating channel by the transmitter 7. Thus, the operating coil 51 of the receiver-relay is energized, and preferably its magnetizing flux is fully built up (which requires an extremely short time after the energization of the coil 51), before the unlatching coil 63 is energized, so that the dropping-out of the receiver-relay shall be under the control of the carrier current, as will now be described.

In the system shown in Fig. 1, the sequence of operation in response to a fault anywhere on the transmission line (within detecting distance of the illustrated relaying station) is first to transmit carrier, regardless of the direction of power-flow, and then to unlatch the receiver relay, and finally to remove the carrier current, if the fault-current is flowing into the protected line-section 1, leaving the carrier current on the line-section if the fault-current is flowing out of the section at the relaying point.

The transmission of carrier-current at one end of the protected line-section, and the maintenance of the carrier-current transmission for a period of time which is longer than the time necessary to unlatch the receiver-relay at the other end of the protected line-section, thus results in communicating, to said other end, the intelligence that there is a fault, accompanied by power-flow out of the line-section at the first-mentioned end.

As soon as the fault occurs on the transmission system, if the fault-current-flow is into the protected line-section, the directional element 15 may, or may not, start to operate, depending upon the severity of the fault. The fault-detector relays 16, 17 and/or 18 instantly respond, however, and remove voltage-restraint from the directional element, permitting the latter to operate as rapidly as possible. Before the directional element 15 can close its front contacts 22 and 23, the overcurrent relays, or one of them, will have initiated carrier-current transmission and unlatched the receiver-relay 20, as has alreadys been described.

After the closure of the overcurrent-relay make-contact 43, the directional-element make-contact 22 will close, provided that the fault is accompanied by power-flow into the protected line-section. As shown in Fig. 1, the directional-element contact 22 re-energizes the grid-restraint circuit 13 by connecting it to the negative bus (—) at 24, thereby instantly blocking the generation and transmission of carrier current by the transmitter 7 at the relaying station. The receiver-relay coil 51 is deenergized, however, only if the carrier-current transmission is blocked at both ends of the protected line-section.

The front contacts 44 of the overcurrent relays 16, 17 and 18 are connected in parallel to each other and are utilized in the tripping of the circuit breaker 3 whenever the directional element 15 is energized (thereby closing its make-contact 23 to indicate power-flow into the line), and whenever, at the same time, the receiver-relay 20 is in its non-actuated position (thereby indicating that power is also flowing into the line-section at the other end thereof). The tripping circuit may be traced from the directional element 15, starting with the negative bus (—) at the terminal 24 and including the front directional-relay contact 23, thence including any one of the three parallel-connected front-contacts 44 of the overcurrent relays 16, 17 and 18, thence through the receiver-relay back-contacts 57, to the tripping coil 6 of the circuit breaker, the tripping circuit being finally completed through the auxiliary front-contact 5 of the circuit breaker, after which the circuit is completed at the positive bus terminal (+).

In the normal operation of the transmission system shown in Fig. 1, the circuit breaker 3 will be closed, the directional element 15 will be held against its back-contact by the voltage-restraint element 30, the three overcurrent relays 16, 17 and 18 will be deenergized, and the receiver-relay 20 will be latched in its actuated position so as to open its back-contacts 57, all as illustrated in Fig. 1. The transmitter 7 will not be transmitting carrier-current because its grid-restraint circuit 13 is closed-circuited through the overcurrent back-contacts 42. The receiver 8 will not be receiving carrier-current energy because the transmitter at the opposite end of the line is likewise restrained against transmitting, by its grid circuit.

If a fault occurs on the transmission system, outside of the protected line-section 1, the internal-fault-responsive directional element 15 at one end of the protected line-section 1 will fail to respond, because the direction of power-flow is necessarily out of the line-section at one end. As soon as an overcurrent back-contact 42 is open, at either end of the protected line-section, the grid-restraint will be removed from the transmitter at that end of the line-section, and the transmitter 7 will send out carrier-current which will energize the receiver-relays 8 at both ends of the line-section, energizing the receiver-relay coils 51 so that the receiver-relays 20 will remain actuated even after they are unlatched by the energization of the unlatching coil 63 in response to the closing of an overcurrent contact 43. There will be no tripping of the circuit breaker 3 at either end of the protected line-section 1, both by reason of the open front-contacts 23 of the directional element 15 at one end of the line-section, and by reason of the open back-contacts 57 of the receiver-relay 20 at both ends of the line-section.

The transmitter 7 at one end of the line-section (where the current-flow is out of the line-section) will continue to transmit carrier-current until the fault, wherever it is, shall be cleared by protective equipment in the line-section where the fault happens to be located, whereupon the fault-responsive overcurrent relays 16, 17 and 18 of the line-section illustrated in the drawings will become deenergized and return to their normal position. It will be observed that the latching element 60 of the receiver-relay 20 must be interposed underneath the movable member 54 of the receiver-relay before the latter has moved materially from its fully actuated position in response to the deenergization of the receiver-relay coil 51 from the carrier-current receiver 8, at the moment when the transmitter ceases transmitting. This may be arranged by suitable relative adjustments of the various springs 56, 59 and 62, and the relative amounts of energization of the coils 51 and 63, or other adjustments of the latching and unlatching times, and of the drop-out time, of the receiver-relay, and/or by a corresponding adjustment of the relative points, in the travel of the overcurrent elements 16, 17 and 18, in which the respective front-contacts 43 open, and the back-contacts 42 close, during the dropping-out movement of the overcurrent element when it is returning to its non-actuated position; or any other suitable means may be provided to insure that the latching element 60 returns to its position under the movable member 54 of the receiver-element 20.

If the fault is in the protected line-section 1, at least one of the overcurrent elements 16, 17 and 18 at each end of the line-section will be actuated, thereby removing voltage-restraint from its corresponding directional element 15, at its end of the protected line-section; and each directional element will immediately respond, opening its back-contact 21 and closing its front-contacts 22 and 23, because the power-flow is into the line at both ends of the section. The response of the overcurrent element 16, 17 or 18 will instantly initiate carrier-transmission, and immediately thereafter unlatch the receiver-relay 20, at each end of the line-section. The response of the directional elements 15 at the two ends of the line-section will remove carrier from both ends of the section, and the receiver elements 20 will be deenergized and will instantly return to their unactuated positions, closing their back-contacts 57 at the two ends of the faulty line-section. A tripping circuit will be instantly energized, at each end of the section, through the make-contact 23 of the directional element, the make-contact 44 of one or more of the overcurrent elements 16, 17 and 18, the back-contact 57 of the receiver-relay 20, and the auxiliary front-contact 5 of the circuit breaker 3.

It is usual to have a contactor 67 in the trip-circuit, said contactor having make-contacts 68 which seal in, bypassing the sensitive protective-relay contacts, and positively maintaining the tripping circuit until it is finally broken by the auxiliary breaker-switch 5.

When the circuit breaker is open, its auxiliary front-contact 5 will open the tripping circuit, and ultimately its auxiliary back-contact 4 will close, but meanwhile the overcurrent elements 16, 17 and 18 will return to their unactuated positions because of the cessation of the fault-current flow. When the auxiliary back-contact 4 of the circuit breaker closes, it energizes the actuating coil 51 of the receiver-relay 20, through a local supply-circuit from (+) to (−), thereby elevating the movable element 54 of the receiver-relay, and permitting the latching member 60 to move underneath the same, thereby restoring the receiver-relay 20 to its normal, latched position.

It has already been pointed out that, when an external fault (that is, one outside of the protected line-section) is being cleared by the operation of circuit-interrupter means outside of the protected line-section, the latching element 60 of the receiver-relay 20 must be returned to its latching position before the movable element 54 is permitted to drop from its fully actuated position, which is slightly above the top of the latching element, of course. There are various circumstances which frequently make it difficult to obtain this sequence of operations, because it frequently happens that one pole of the circuit breaker which is interrupting the fault-current will cease arcing before the other poles, thereby producing an asymmetrical current-flow which will have a reversed power-direction, or, in the case of a multiple-circuit transmission-line, in which there are two line-sections in parallel, the current may suddenly reverse in the sound line while the circuit breakers are in the process of opening, in the parallel faulty line, so that it is sometimes difficult to insure that carrier is not prematurely removed from the out-flowing-current end of a sound line-section.

Because of these difficulties, and because of the necessity for insuring that my receiver-relay latching-member shall be released by the unlatching coil 63 before the removal of carrier, when an external fault is being cleared, I prefer to utilize some sort of power-reversal protective mechanism, such as is shown in an Evans et al. Patent 2,005,136, granted June 18, 1935, and in a Le Vesconte et al. Patent 2,005,148, granted June 18, 1935, for interposing a predetermined time-delay, as may be determined by the exigencies of the particular transmission system under consideration) against the sudden indication of an internal fault immediately after there has been an indication of an external fault, without interposing any delay at all in the initial indication regarding the location of the fault.

In Fig. 1, I have indicated a novel form of power-reversal protective mechanism in which it is not necessary to utilize a separate directional element which is responsive to external faults. The difficulty with using a non-action of an internal-fault-responsive directional element to indicate an external fault is that it takes the internal element a certain time, which varies with the conditions and may be of the order of one cycle, more or less, on a 60-cycle system, to give a reliable directional indication, after the occurrence of a fault. In my Fig. 1 system, I therefore utilize the fault-responsive relays 16, 17 and 18, or any one of them, to close their make-contacts 45 in response to a fault, and I use these contacts, connected in parallel, to energize an auxiliary relay 71 which closes its make-contacts 72 only after a slight time-delay sufficient to enable the directional element 15 to make a reliable directional response, if it is going to respond. This slight time-delay in the auxiliary relay 71 may be obtained by any suitable means, which have been symbolically designated by a dash-pot 73. I utilize the back-contact 21 of the internal-fault directional element 15 to give an indication of the non-action of the directional element, connecting this contact in series with the auxiliary-relay make-contact 72, to energize a timer relay 74.

The time relay 74 has normally closed back-contacts 75 which are in series with the grid-restraint circuit 13 of the transmitter 7. As soon as the timer relay 74 is energized, its back-contacts 75 immediately open, thereby interposing a second break in the grid-restraint circuit 13, the first break having been made at the back-contacts 42 of the fault-responsive relays 16, 17 and 18. The timer relay 74 is provided with any suitable means for delaying the reclosure of its back-contacts 75 after the deenergization of the relay, such time-delay means being indicated symbolically by a dash-pot 76 which delays the downward or return movement of the relay, without delaying its pick-up movement. If the internal-fault directional element 15 at first fails to respond, thereby energizing the timing relay 74, a subsequent response, opening the back-contact 21 of the directional element, will not result in an immediate blocking of the carrier-current transmission, even though the directional-element contact 22 closes, because of the break which is interposed in the grid-restraint circuit at 75, by the timer relay 74.

An important feature of the illustrated embodiments of my relaying system is that the receiver-relay 20 must not be permitted to return to its non-actuated position, at the end of the protected line-section where current is flowing into the section, if current is flowing out of the section at the other end thereof, as the slightest touching of the receiver back-contacts 57 will instantly trip the circuit breaker, provided, of course, that the other contacts in the trip-circuit are closed. Thus, in the system shown in Fig. 1, it is necessary for the actuating coil 51 of the receiver-relay to be sufficiently energized, by the receipt of carrier, to hold up the movable element 54 of the relay, before the unlatching coil 63 unlatches the same. In the embodiment of my invention shown in Fig. 1, this sequence is insured by always initiating carrier-transmission in response to a fault, regardless of whether the direction of power-flow is internally or externally of the protected line-section, as this operation can be performed more quickly than a reliable directional indication may be obtained in response to the direction of power-flow.

If the power-direction is internal, at both ends of the protected line-section, the internal-fault directional elements 15 at the two ends of the line-section will remove carrier, deenergizing the receiver-relay coil 51, and permitting the receiver-relay to drop out as soon as the magnetic flux of the operating coil 51 subsides sufficiently, assuming that meanwhile the latching element 60 has been unlatched by the energization of the unlatching coil 63, which is easily accomplished prior to the completion of the directional response. If the fault is external of the protected line-section, the power-direction will be out of the section at one end thereof, and carrier will not be removed at that end, so that, at the moment when the directional element 15 closes its make-contacts at the end where the power-flow is into the section, the receiver-relay 20 will be energized, thereby preventing tripping.

The time required to energize the tripping circuit in response to an internal fault, in the system shown in Fig. 1, is, therefore, the time required to obtain a reliable response of the directional element 15 plus the time required for the receiver-element to drop out, after the response of the directional element.

In the system shown in Fig. 2, I do not initiate carrier-current transmission unless there is an external fault, and the time necessary to effect the energization of the tripping circuit is, therefore, the time required to obtain a reliable external-fault directional indication, plus the time necessary to unlatch the receiver-relay, which time may be made very small by "soaking" a large current into the unlatching coil of the receiver-relay and by utilizing heavy biasing springs on the receiver-relay, so as to cause it to return promptly to its non-energized position.

There is thus a slightly different make-up of the times necessary to initiate the energization of the trip-circuit in the two systems shown in Figs. 1 and 2. It may sometimes happen that the system of Fig. 1 may be subject to the same difficulty which is present in the previously known carrier-relaying system utilizing a receiver element which is normally constantly energized from a local source, even when carrier is not being transmitted, said difficulty being the time necessary for the receiver-relay flux to subside sufficiently to permit the relay to drop out, after its normally energized coil is deenergized. This time, although slight, may assume large relative proportions in a system in which it is endeavored to utilize less than one cycle, on a 60-cycle system, between the occurrence of the fault and the energization of the tripping circuit. My system shown in Fig. 2 avoids this difficulty respecting the drop-out time-lag of the receiver-relay, by not energizing the receiver-relay at all, unless the fault is external of the protected line-section.

The system of Fig. 2 utilizes the internal fault-responsive directional element 15, the fault-detector elements 16, 17 and 18 and the mechanically latched receiver-relay 20, which may be substantially the same as in the Fig. 1 system, and in addition, an external fault-responsive directional element 80 is utilized, for giving a prompt, direct indication of an external fault. In Fig. 2, the internal directional element 15 is not provided with a back-contact, but simply has a back-stop 81, and two make-contacts 82 and 83. Each of the overcurrent elements 16, 17 and 18 is provided with one back-contact 84 and three make-contacts 85, 86 and 87.

The receiver element 20 of Fig. 2 is provided, as before, with a back-contact 57, being constructed in every way similarly to the receiver relay-element 20 of Fig. 1, except that insulation 88 is inserted underneath the tip of the movable element 54 of the relay where contact is made with the top of the latching element 60, and the latching element is connected to a source of electrical energy, such as the negative bus (—), as indicated at 89, while the movable element 54 of the relay is connected to the terminal of the actuating coil 51, as indicated by the connection 90, so that, whenever the unlatching coil 63 is deenergized, thereby permitting the latching spring 62 to try to return the latching element 60 to latching position, if the receiver-relay 20 is then in its non-actuated position, a contact will be made between the latching element 60 and the non-actuated part of the movable element 54, momentarily energizing the actuating coil 51, and restoring the receiver relay to its normal latched position, thereby taking care of all possible contingencies in regard to the resetting of the mechanically latched receiver-relay.

The external-fault-responsive directional element 80 of the Fig. 2 system may be provided with four wattmetric torque-elements 30, 91, 92 and 93 which are similar to the corresponding elements in Fig. 1, except that the directionally responsive torque-elements 91, 92 and 93 are reversely connected, so as to be responsive to develop an actuating torque in response to power-flow from the line, as indicated by the arrows and legend. The external directional element 80 is provided with a back-stop 94, with a make-contact 95, and with an insulated member 96 which strikes against a contact-spring 97 and opens a back-contact 98, when the directional element moves in response to an actuating torque of the externally responsive directional members 91, 92 and 93.

In the system shown in Fig. 2, the back-contacts 84 of the overcurrent elements 16, 17 and 18 are utilized to remove voltage-restraint from both of the directional elements 15 and 80, as will be readily apparent from the drawings.

As soon as voltage-restraint is removed from the external directional element 80, if the power-current flow is out of the line-section, this element begins to respond, and after the shortest possible movement of its movable member, it strikes the spring contact-member 97 and breaks the back-contact 98, thereby removing grid-restraint from the transmitter 7, by open-circuiting the grid-restraint circuit 13, causing the transmitter to immediately initiate carrier-transmission. This energizes the actuating coil 51 of the receiver-relays 20 at both ends of the protected line-section.

Meanwhile, the internal-fault directional element 15, at the end of the line-section where the power-current flow is into the section, will respond and will close its make-contact 83. In the event of an external fault, the power flow will always be into the protected section at one end and out of it at the other end, so that the internal fault directional element 15 at the first end will begin to operate, and the external-fault directional element 80 at the second end will begin to operate. As these two directional elements are similar in construction, and are energized with the same currents, their operating times should be substantially identical, particularly if the voltages supplied to the directional elements do not vary greatly at times of fault, as may be assured by utilizing a synchronous motor-generator set 99 in the voltage-supply circuit of the directional elements. The construction is such that the internally responsive element 15 must make a longer movement of travel, before closing its make-contact 83, than the travel required of the externally responsive element 80 to break the back-contact 98, thus assuring the desired time-sequence without having to introduce a fixed time-delay to allow for the worst possible conditions.

By this time, the fault-responsive relays 16, 17 and 18 at both ends of the section will have completed their pick-up movement, closing all of their make-contacts 85, 86 and 87.

When the internally responsive directional element 15 closes its make-contact 83, therefore, a circuit is completed from the positive bus (+), which is connected at 100 to the movable member of the directional element 15, through the make-contact 83, and then through any one of the three make-contacts 85 of the overcurrent elements 16, 17 and 18, to the unlatching coil 63 of the receiver-relay 20. If the receiver-relay has not been already energized by the transmission of carrier from the other end of the protected line-section, as a result of a response of the externally responsive directional element 80 at that end, the receiver-relay will immediately drop out and close its back-contacts 57, thereby closing a tripping circuit which may be traced, from the positive terminal (+) at 100, through the directional make-contact 82, any one of the three overcurrent make-contacts 86, and the receiver-relay back-contact 57, to the trip coil 6.

In my Fig. 2 system, my power-reversal protective means takes advantage of a directional indication of an external fault, by utilizing the external directional make-contact 95 to energize a timer-relay 101 which opens its back-contact 102 and interposes a break in the grid-restraint circuit 13 of the transmitter 7. The timer relay 101 is energized from the external directional contact 95 in series with any one of the overcurrent make-contacts 87. The timing function of the timer relay 101 is controlled by means of a dashpot 103 similar to the dashpot 76 in Fig. 1.

In the operation of the system shown in Fig. 2, in case there is an internal fault, there will be no response of the directional element 80 at either end of the protected line-section so that carrier current will not be superimposed on the line-section at all. The closure of the internal directional contact 83 and any one of the overcurrent contacts 85 will trip the receiver-relay 20, at each end of the protected line-section, thereby instantly tripping the circuit breaker 3, as has been previously described.

As soon as the circuit breaker 3 has been tripped, the overcurrent elements, 16, 17 and 18 will drop to non-energized position, and the unlatching coil 63 will be deenergized, permitting the latching member 60 to close against the movable member 54 of the receiver-relay 20, thereby making a circuit, through 89 and 90, which momentarily energizes the actuating coil 51 and relatches the receiver-relay 20, breaking the momentary latching circuit at 88, in the process.

In the event of an external fault, the fault-current will be flowing out of the protected line-section at one end, and the externally-responsive directional element 80 at that end will superimpose carrier current on the protected line-section and energize the receiver-relays 20 at both ends of the line-section before the unlatching coils 63 are energized, thereby making sure that neither one of the receiver-relays 20, at the two ends of the section, will even momentarily drop and close its back-contact 57. Tripping is thus positively prevented, even at the end where the power-flow is into the line-section so that the directional-relay contact 82 is closed. Also, in Fig. 2, when there is a positive indication of an external fault, an impediment is interposed against the immediate quick indication of an internal current-flow, by means of the timer-relay contact 102 already described.

While I have referred to the invention in the foregoing description, and shall refer to it, in the accompanying claims, as involving the communication of intelligence from one end to another of a protected line-section, I wish this language to be understood as embracing also the case of a multi-ended section in which intelligence is communicated between more than two ends thereof, as in a T-connection.

While I have illustrated my invention in two preferred forms of embodiment, it will be obvious that many changes in details of execution may be made, without departing from the essential principles and effects of the system. I desire, therefore, that the embodiments which are described and illustrated shall be regarded only in an illustrative sense and that the appended claims shall be accorded the broadest interpretation consistent with their language and the prior art.

I claim as my invention:

1. Protective relaying equipment for effecting a control of line-sectionalizing circuit-interrupter means at one end of a transmission line-section, comprising means for providing a communicating channel between the two ends of the protected line-section, electric-current means at the other end of the line-section for transmitting a signal through said communicating channel, means at said other end responsive selectively to faults accompanied by current-flow direction out of the protected line-section for transmitting a signal thereof through said communicating channel to the first-mentioned end of the protected line-section, and, at the first-mentioned end of the protected line-section, auxiliary relay-means having means for biasing it towards a non-actuated position and mechanical-latch means for latching it in an actuated position, means responsive at least to faults within the protected line-section for causing said mechanically latching means to move the unlatching position, means responsive to the receipt of the aforesaid signal transmitted through the communicating channel from the other end of the protected line-section for retaining said auxiliary relay-means in its actuated position, and means for utilizing a non-actuated position of said auxiliary relay-means in the control of the circuit-interrupter means.

2. Protective relaying equipment for effecting a control of line-sectionalizing circuit-interrupter means at one end of a transmission line-section, comprising means for providing a communicating channel between the two ends of the protected line-section, electric-current means at the other end of the line-section for transmitting a signal through said communicating channel, means at said other end responsive selectively to faults accompanied by current-flow direction out of the protected line-section for transmitting a signal thereof through said communicating channel to the first-mentioned end of the protected line-section, and, at the first-mentioned end of the protected line-section, auxiliary relay-means having means for biasing it towards a non-actuated position and mechanical-latch means for latching it in an actuated position, means responsive at least to faults within the protected line-section for causing said mechanically latching means to move to unlatching position, means responsive to the receipt of the aforesaid signal transmitted through the communicating channel from the other end of the protected line-section for actuating said auxiliary relay-means, means responsive selectively to faults accompanied by current-flow into the protected line-section, and accompanied further by a non-actuated position of said auxiliary relay-means, for quickly energizing a control circuit for the circuit-interrupter means, and means for resetting the auxiliary relay-means to its latched position.

3. Protective relaying equipment for effecting a control of line-sectionalizing circuit-interrupter means at one end of a transmission line-section, comprising means for providing a communicating channel between the two ends of the protected line-section, means at the other end of the line-section responsive selectively to faults accompanied by current-flow direction out of the protected line-section for causing a signal-current to be transmitted through said communicating channel to the first-mentioned end of the protected line-section during a time which will permit the fault-responsive means at said first-mentioned end to prevent a line-sectionalizing circuit-interrupter operation, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, said receiver-relay means responding to said signal-currents in such manner as to cause said receiver-relay means to move to, or remain in, its actuated position, means responsive at least to faults within the protected line-section for causing said mechanically latching means to move to unlatching position, and means responsive selectively to faults accompanied by current-flow into the protected line-section, and accompanied further by a non-actuated position of said receiver-relay means, for quickly energizing a control circuit for the circuit-interrupter means.

4. Protective relaying equipment for effecting a control of line-sectionalizing circuit-interrupter means at one end of a transmission line-section, comprising means for providing a communicating channel between the two ends of the protected line-section, means at the other end of the line-section responsive selectively to faults accompanied by current-flow direction out of the protected line-section for causing a signal-current to be transmitted through said communicating channel to the first-mentioned end of the protected line-section during a time which will permit the fault-responsive means at said first-mentioned end to prevent a line-sectionalizing circuit-interrupter operation, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, said receiver-relay means responding to said signal-currents in such manner as to cause said receiver-relay means to move to, or remain in, its actuated position, means responsive selectively to faults for causing said mechanically latching means to move to unlatching position, means responsive selectively to faults accompanied by a non-actuated position of said receiver-relay means, for quickly energizing a control circuit for the circuit-interrupter means, and means for resetting the receiver-relay means to its normal latched position.

5. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, means responsive to fault-conditions irrespective of the direction of fault-currents for quickly initiating the effective operation of said transmitter-means and for restoring the ineffective condition of the transmitter-means after the cessation of fault-conditions, receiver-relay means for receiving and responding to all signalling currents which have been transmitted into said communicating channel from either or both ends thereof, said receiver-relay means being biased towards a non-actuated position, means for normally mechanically latching said receiver-relay means in an actuated position, means responsive at least to fault-conditions which are accompanied by current-flow direction into the protected line-section for causing said mechanically latching means to move to unlatching position at a time subsequent to the energization of said receiver-relay means by a received signalling current, and for causing said mechanically latching means to return to latching position, in response to a cessation of fault-conditions, at a time prior to the aforesaid restoration of the ineffective condition of the transmitter-means after the cessation of fault-conditions, means selectively responsive to fault-conditions which are accompanied by current-flow direction into the protected line-section for quickly restoring the ineffective condition of the transmitter-means at a time subsequent to the initiation of the effective operation of said transmitter-means, means for utilizing a non-actuated position of said receiver-relay means in the control of the circuit-interrupter means, and means for resetting the receiver-relay means to its latched position.

6. The invention as set forth in claim 5, characterized by said resetting means including an auxiliary back-contact on a circuit interrupter means for energizing the receiver-relay means when the circuit-interrupter means is open.

7. Protective relaying equipment for effecting a control of line-sectionalizing circuit-interrupter means for a transmission line-section, comprising, at each end of the line-section being protected, relaying means including a directionally responsive quick-acting relaying means selectively responsive to current-flow direction into the protected line-section, and a fault-responsive quick-acting relaying means selectively responsive to fault conditions as distinguished from normal operating conditions, a communicating channel between the two ends of the protected line-section, means responsive to a response of said fault-responsive means regardless of the direction of the fault-current for initiating the transmission of a signal-current through said communicating channel to the far end of the protected line-section, receiver-relay means for receiving transmitted signal-current in said communicating channel, said receiver-relay means being biased towards a non-actuated position, means for normally mechanically latching said receiver-relay means in an actuated position, means responsive to a response of said directionally responsive means for blocking said transmission of signal-current, means responsive to a response of said fault-responsive means for causing said mechanically latching means to move to unlatching position, means responsive to a response of both said directional means and said fault-responsive means, accompanied by a non-actuated position of said receiver-relay means, for quickly energizing a control circuit for the circuit-interrupter means, and means for resetting the receiver-relay means to its normal latched position.

8. Protective relaying equipment for effecting a control of line-sectionalizing circuit-interrupter means for a transmission line-section, comprising, at each end of the line-section being protected, means for providing a communicating channel between the two ends of the protected line-section, transmitter means capable of transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, directional relay-means having directionally responsive means for developing an actuating torque in response to current-flow into the protected line-section and a restraining torque in response to current-flow from the protected line-section, said directional relay-means also having a normally effective means tending to inhibit its operation, fault-responsive means for quickly relieving said normally effective inhibition and for unlatching said receiver-relay means responsive to an actuation of said directional relay-means for quickly preventing the transmission of a signaling current into said communicating channel at that end of the protected line-section, means for utilizing a non-actuated position of said receiver-relay means in the control of the circuit-interrupter means, and means for resetting the receiver-relay means to its latched position.

9. Protective relaying equipment for effecting a control of line-sectionalizing circuit-interrupter means for a transmission line-section, comprising, at each end of the line-section being protected, means for providing a communicating channel between the two ends of the protected line-section, directional relay-means having directionally responsive means for developing an actuating torque in response to current-flow into the protected line-section and a restraining torque in response to current-flow from the protected line-section, said directional relay-means also having a normally effective means tending to inhibit its operation, fault-responsive means for quickly relieving said normally effective inhibition and for quickly transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, fault-responsive means for unlatching said receiver-relay means immediately after said transmission of a signalling current into said communicating channel, means responsive to an actuation of said directional relay-means for quickly preventing the transmission of a signalling current into said communicating channel at that end of the protected line-section, and means for utilizing a non-actuated position of said receiver-relay means in the control of the circuit-interrupter means.

10. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the receiver signalling currents for causing said receiver-relay to be normally restrained in an actuated condition during times when there are no signalling currents transmitted into said communicating channel, means responsive selectively to fault-conditions which are accompanied by current-flow from the protected line-section for initiating the effective operation of said transmitter-means and for restoring the ineffective condition of the transmitter-means after the cessation of said fault-conditions, means responsive at least to fault-conditions which are accompanied by current-flow into the protected line-section for rendering ineffective the normally operative restraining means of the receiver-relay means at a time subsequent to the time required for the initiation of the effective operation of said transmitter-means, and for restoring the effective operation of said restraining means in response to a cessation of fault-conditions at a time prior to the aforesaid restoration of the ineffective condition of the transmitter-means after the cessation of fault-conditions, and means for utilizing a non-actuated condition of said receiver-relay means in the control of said circuit-interrupter means.

11. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the receiver signalling currents for causing said receiver-relay to be normally restrained in an actuated condition during times when there are no signalling currents transmitted into said communicating channel, means responsive selectively to fault-conditions which are accompanied by current-flow from the protected line-section for causing the effective operation of said transmitter-means during a time which will permit the equipment at the far end of the protected line-section to prevent a line-sectionalizing circuit-interrupter operation and for restoring the ineffective condition of the transmitter-means after the cessation of said fault-conditions, means responsive selectively to fault-conditions which are accompanied by current-flow into the protected line-section for rendering ineffective the normally operative restraining means of the receiver-relay means at a time subsequent to the time required for the initiation of the effective operation of said transmitter-means, and for restoring the effective operation of said restraining means in response to a cessation of fault-conditions at a time prior to the aforesaid restoration of the ineffective condition of the transmitter-means after the cessation of fault-conditions, and means for utilizing a non-actuated condition of said receiver-relay means in the control of the circuit-interrupter means.

12. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated position, means for normally mechanically latching said receiver-relay means in an actuated position, means responsive selectively to fault-conditions which are accompanied by current-flow from the protected line-section for initiating the effective operation of said transmitter-means and for restoring the ineffective condition of the transmitter-means after the cessation of said fault-conditions, means responsive at least to fault-conditions which are accompanied by current-flow into the protected line-section for causing said mechanically latching means to move to unlatching position at a time subsequent to the time required for the initiation of the effective operation of said transmitter-means, and for causing said mechanically latching means to return to latching position in response to a cessation of fault-conditions at a time prior to the aforesaid restoration of the ineffective condition of the transmitter-means after the cessation of fault-conditions, and means for utilizing a non-actuated position of said receiver-relay means in the control of said circuit interrupter means.

13. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated position, means for normally mechanically latching said receiver-relay means in an actuated position, means responsive selectively to fault-conditions which are accompanied by current-flow from the protected line-section for initiating the effective operation of said transmitter-means and for restoring the ineffective condition of the transmitter-means after the cessation of said fault-conditions, means responsive selectively to fault-conditions which are accompanied by current-flow into the protected line-section for causing said mechanically latching means to move to unlatching position at a time subsequent to the time required for the initiation of the effective operation of said transmitter-means, and for causing said mechanically latching means to return to latching position, in response to a cessation of fault-conditions, at a time prior to the aforesaid restoration of the ineffective condition of the transmitter-means after the cessation of fault-conditions, and means for utilizing a non-actuated position of said receiver-relay means in the control of said circuit-interrupter means.

14. The invention as set forth in claim 12, characterized by said receiver-relay means comprising an actuating coil, a movable relay-element adapted to be actuated by said actuating coil, said movable relay-element comprising biasing means tending to move the same to a non-actuated position, a movable latching element disposed in cooperative position with respect to said movable relay-element, said movable latching element comprising biasing means tending to move the same to a latched position for holding said movable relay-element in an actuated position, an unlatching means effective, when energized, to move said latching element to an unlatched position, and resetting means including a contact made by said latching element with said movable relay-element when the former is released and the latter is in a non-actuated position, and means responsive to said contact for momentarily actuating said actuating coil of the relay.

15. Protective relaying equipment for effecting a control of line-sectionalizing circuit-interrupter means at one end of a transmission line-section, comprising means for providing a communicating channel between the two ends of the protected line-section, means at the other end of the line-section responsive selectively to faults accompanied by current-flow direction out of the protected line-section for initiating the transmission of a signal-current through said communicating channel to the first-mentioned end of the protected line-section, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, means responsive at least to faults within the protected line-section for causing said mechanically latching means to move to unlatching position, and means for utilizing a non-actuated position of said receiver-relay means in the control of the circuit-interrupter means.

16. Protective relaying equipment for effecting a control of line-sectionalizing circuit-interrupter means for a transmission line-section, comprising, at each end of the line-section being protected, relaying means including a directionally responsive quick-acting relaying means selectively responsive to current-flow direction into the protected line-section, and a fault-responsive quick-acting relaying means selectively responsive to fault-conditions as distinguished from normal operating conditions, a communicating channel between the two ends of the protected line-section, means responsive to a response of said fault-responsive means accompanied by a non-response of said directional means for causing the transmission of a signal-current under such circumstances through said communicating channel to the far end of the protected line-section, receiver-relay means for receiving transmitted signal-currents in said communicating channel, said receiver-relay means being biased towards a non-actuated position, means for normally mechanically latching said receiver-relay means in an actuated position, means responsive to a response of said fault-responsive means for causing said mechanically latching means to move to unlatching position means for utilizing a non-actuated position of said receiver-relay means in the control of the circuit-interrupter means, and means for resetting the receiver-relay means to its normal latched position.

17. Protective relaying equipment for effecting a control of line-sectionalizing circuit-interrupter means at one end of a transmission line-section, comprising means for providing a communicating channel between the two ends of the protected line-section, means at the other end of the line-section responsive selectively to faults accompanied by current-flow direction out of the protected line-section for initiating the transmission of a signal-current through said communicating channel to the first-mentioned end of the protected line-section, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, means responsive selectively to faults accompanied by current-flow direction into the protected line-section for causing said mechanically latching means to move to unlatching position, means for utilizing a non-actuated position of said receiver-relay means in the control of the circuit-interrupter means, and means for resetting the receiver-relay means to its normal latched position.

18. Protective relaying equipment for effecting a control of line-sectionalizing circuit-interrupter means at one end of a transmission line-section, comprising relaying means at the other end of the line-section including a directionally responsive quick-acting relaying means selectively responsive to current-flow direction into the protected line-section, a fault-responsive quick-acting relaying means at said other end of the line-section selectively responsive to fault-conditions as distinguished from normal operating conditions, a communicating channel between the two ends of the protected line-section, means at said other end of the line-section responsive to a response of said fault-responsive means under conditions when there is a non-response of said directional means for causing the transmission of a signal-current under such circumstances through said communicating channel to the first-mentioned end of the protected line-section, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, means responsive at least to fault-conditions which are accompanied by current-flow direction into the protected line-section for causing said mechanically latching means to move to unlatching position, and means for utilizing a non-actuated position of said receiver-relay means in the control of the circuit-interrupter means.

19. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the received signalling current for causing said receiver-relay to be normally restrained in an actuated condition during times when there are no signalling currents transmitted into said communicating channel, directional relay-means having directionally responsive means for developing an internal-fault force in response to current-flow into the protected line-section and an external-fault force in response to current-flow from the protected line-section, said directional relay-means including means for indicating a response to internal-fault force and means for indicating a response to external-fault force, means responsive to an external-fault response of said directional relay-means for quickly initiating the effective operation of said transmitter-means, means responsive to an internal-fault response of said directional relay-means for rendering ineffective the normally operative restraining means of the receiver-relay means after a time sufficient for said external-fault directional response to initiate the effective operation of said transmitter-means under any operative conditions of current-flow from the protected line-section, and means for utilizing a non-actuated condition of said receiver-relay means in the control of the circuit-interrupter means.

20. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the received signalling currents for causing said receiver-relay to be normally restrained in an actuated condition during times when there are no signalling currents transmitted into said communicating channel, internal-fault directional relay-means having directionally responsive means for developing an actuating force in response to current-flow into the protected line-section and a restraining force in response to current-flow from the protected line-section, said internal-fault directional relay-means also having a normally effective means tending to inhibit its operation, external-fault directional relay-means having directionally responsive means for developing an actuating force in response to current-flow from the protected line-section and a restraining force in response to current-flow into the protected line-section, said external-fault directional relay-means also having a normally effective means tending to inhibit its operation, fault-responsive means for quickly relieving said normally effective inhibitions in both directional relay-means, means responsive to an actuation of said external-fault directional relay-means for quickly initiating the effective operation of said transmitter-means, means responsive to an actuation of said internal-fault directional relay-means for rendering ineffective the normally operative restraining means of the receiver-relay means after a time sufficient for said external-fault directional relay-means to initiate the effective operation of said transmitter-means under any operative conditions of current-flow from the protected line-section, and means for utilizing a non-actuated condition of said receiver-relay means in the control of the circuit-interrupter means.

21. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the received signalling currents for causing said receiver-relay to be normally restrained in an actuated condition during times when there are no signalling currents transmitted into said communicating channel, directional relay-means having directionally responsive means for developing an internal-fault force in response to current-flow into the protected line-section and an external-fault force in response to current flow from the protected line-section, said directional relay-means including means for indicating a response to internal-fault force and means for indicating a response to external-fault force, means responsive to an external-fault response of said directional relay-means for quickly initiating the effective operation of said transmitter-means, means responsive at least to faults within the protected line-section for rendering ineffective the normally operative restraining means of the receiver-relay means after a time sufficient for said external-fault directional response to initiate the effective operation of said transmitter-means under any operative conditions of current-flow from the protected line-section, and means for utilizing a non-actuated condition of said receiver-relay means in the control of the circuit-interrupter means.

22. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means other than the received signaling currents for causing said receiver-relay to be normally restrained in an actuated condition during times when there are no signalling currents transmitted into said communicating channel, internal-fault directional relay-means having directionally responsive means for developing an actuating force in response to current-flow into the protected line-section and a restraining force in response to current-flow from the protected line-section, said internal-fault directional relay-means also having a normally effective means tending to inhibit its operation, external-fault directional relay-means having directionally responsive means for developing an actuating force in response to current-flow from the protected line-section and a restraining force in response to current-flow into the protected line-section, said external-fault directional relay-means also having a normally effective means tending to inhibit its operation, fault-responsive means for quickly relieving said normally effective inhibitions in both directional relay-means, means responsive to an actuation of said external-fault directional relay-means for quickly initiating the effective operation of said transmitter-means, means responsive at least to faults within the protected line-section for rendering ineffective the normally operative restraining means of the receiver-relay means after a time sufficient for said external-fault directional relay-means to initiate the effective operation of said transmitter-means under any operative conditions of current-flow from the protected line-section, and means for utilizing a non-actuated condition of said receiver-relay means in the control of the circuit-interrupter means.

23. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, internal-fault directional relay-means having directionally responsive means for developing an actuating force in response to current-flow into the protected line-section and a restraining fore in response to current-flow from the protected line-section, said internal-fault directional relay-means also having a normally effective means tending to inhibit its operation, external-fault directional relay-means having directionally responsive means for developing an actuating force in response to current-flow from the protected line-section and a restraining force in response to current-flow into the protected line-section, said external-fault directional relay-means also having a normally effective means tending to inhibit its operation, fault-responsive means for quickly relieving said normally effective inhibitions in both directional relay-means means responsive to an actuation of said external-fault directional relay-means for quickly initiating the effective operation of said transmitter-means, means responsive to an actuation of said internal-fault directional relay-means for unlatching the receiver-relay means after a time sufficient for said external-fault directional relay-means to initiate the effective operation of said transmitter-means under any operative conditions of current-flow from the protected line-section, and means for utilizing a non-actuated position of said receiver-relay means in the control of the circuit-interrupter means.

24. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, internal-fault directional relay-means having directionally responsive means for developing an actuating force in response to current-flow into the protected line-section and a restraining force in response to current-flow from the protected line-section, said internal-fault directional relay-means also having a normally effective means tending to inhibit its operation, external-fault directional relay-means having directionally responsive means for developing an actuating force in response to current-flow from the protected line-section and a restraining force in response to current-flow into the protected line-section, said external-fault directional relay-means also having a normally effective means tending to inhibit its operation, fault-responsive means for quickly relieving said normally effective inhibitions in both directional relay-means, means responsive to an actuation of said external-fault directional relay-means for quickly initiating the effective operation of said transmitter-means, means responsive at least to faults within the protected line-section for unlatching the receiver-relay means after a time sufficient for said external-fault directional relay-means to initiate the effective operation of said transmitter-means under any operative conditions of current-flow from the protected line-section, and means for utilizing a non-actuated position of said receiver-relay means in the control of the circuit-interrupter means.

25. Protective relaying equipment for effecting a control of line-sectionalizing circuit-interrupter means at one end of a transmission line-section, comprising means for providing a communicating channel between the two ends of the protected line-section, means at the other end of the line-section responsive selectively to faults accompanied by current-flow direction out of the protected line-section for causing a signal-current to be transmitted through said communicating channel to the first-mentioned end of the protected line-section during a time which will permit the fault-responsive means at said first mentioned end to prevent a line-sectionalizing circuit-interrupter operation, and for maintaining said transmission of signal-current for a predetermined time after any sudden reversal of current-flow direction during a continuance of said faults, and, at the first-mentioned end of the protected line-section, receiver-relay means for receiving transmitted signal-currents in said communicating channel, said receiver-relay means being biased towards a non-actuated position, means for normally mechanically latching said receiver-relay means in an actuated position, said receiver-relay means responding to said signal-currents in such manner as to cause said receiver-relay means to move to, or remain in, its actuated position, means responsive at least to faults within the protected line-section for causing said mechanically latching means to move to unlatching position, and means for utilizing a non-actuated position of said receiver-relay means in the control of the circuit-interrupter means.

26. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, means responsive to fault-conditions irrespective of the direction of fault-currents for quickly initiating the effective operation of said transmitter-means and for restoring the ineffective condition of the transmitter-means after the cessation of fault-conditions, receiver-relay means for receiving and responding to all signalling currents which have been transmitted into said communicating channel from either or both ends thereof, said receiver-relay means being biased towards a non-actuated position, means for normally mechanically latching said receiver-relay means in an actuated position, means responsive at least to fault-conditions which are accompanied by current-flow direction into the protected line-section for causing said mechanically latching means to move to unlatching position at a time subsequent to the energization of said receiver-relay means by a received signalling current, and for releasing said mechanically latching means, in response to a cessation of fault-conditions, at a time prior to the aforesaid restoration of the ineffective condition of the transmitter-means after the cessation of fault-conditions, means selectively responsive to fault-conditions which are accompanied by current-flow direction into the protected line-section for quickly restoring the ineffective condition of the transmitter-means at a time subsequent to the initiation of the effective operation of said transmitter-means, means directionally responsive to a fault-condition accompanied by current-flow from the protected line-section for thereafter interposing an impediment to any immediate quick prevention of signal-current transmission into the communicating channel at that end of the protected line-section, means for utilizing a non-actuating position of said receiver-relay means in the control of the circuit-interrupter means, and means for resetting the receiver-relay means to its latched position.

27. Protective relaying equipment for effecting a control of line-sectionalizing circuit-interrupter means for a transmission line-section, comprising, at each end of the line-section being protected, means for providing a communicating channel between the two ends of the protected line-section, transmitter-means capable of transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, fault-responsive directional relay-means having directionally responsive means for developing an actuating force in response to current-flow into the protected line-section and a restraining force in response to current-flow from the protected line-section, fault-responsive means for unlatching said receiver-relay means, means responsive to an actuation of said directional relay-means for quickly preventing the transmission of a signalling current into said communicating channel at that end of the protected line-section, means directionally responsive to a fault-condition accompanied by current-flow from the protected line-section for thereafter interposing an impediment to any immediate quick prevention of signal-current transmission into the communicating channel at that end of the protected line-section, means responsive to a non-actuated position of said receiver-relay means for energizing a control circuit for the circuit-interrupter means, and means for resetting the receiver-relay means to its latched position.

28. Protective relaying equipment for effecting a control of line-sectionalizing circuit-interrupter means for a transmission line-section, comprising, at each end of the line-section being protected, means for providing a communicating channel between the two ends of the protected line-section, fault-responsive directional relay-means having directionally responsive means for developing an actuating force in response to current-flow into the protected line-section and a restraining force in response to current-flow from the protected line-section, fault-responsive means for quickly transmitting a signalling current into said communicating channel, receiver-relay means for receiving signalling currents which have been transmitted into said communicating channel, said receiver-relay means being normally biased towards a non-actuated position, means for normally latching said receiver-relay means in an actuated position, fault-responsive means for unlatching said receiver-relay means immediately after said transmission of a signalling current into said communicating channel, means responsive to an actuation of said directional relay-means for quickly preventing the transmission of a signalling current into said communicating channel at that end of the protected line-section, means directionally responsive to a fault-condition accompanied by current-flow from the protected line-section for thereafter interposing an impediment to any immediate quick prevention of signal-current transmission into the communicating channel at that end of the protected line-section, means responsive to a non-actuated position of said receiver-relay means for energizing a control circuit for the circuit-interrupter means, and means for resetting the receiver-relay means to its latched position.

29. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated position, means for normally mechanically latching said receiver-relay means in an actuated position, means responsive selectively to fault-conditions which are accompanied by current-flow from the protected line-section, for initiating the effective operation of said transmitter-means, and for restoring the ineffective condition of the transmitter-means after the cessation of fault-conditions, and for maintaining said transmission of signal-current for a predetermined time after any sudden reversal of current-flow direction during a continuance of said fault-conditions, means responsive at least to fault-conditions which are accompanied by current-flow into the protected line-section for causing said mechanically latching means to move to unlatching position at a time subsequent to the time required for the initiation of the effective operation of said transmitter-means, and for causing said mechanically latching means to return to latching position, in response to a cessation of fault-conditions, at a time prior to the aforesaid restoration of the ineffective condition of the transmitter-means after the cessation of fault-conditions, and means for utilizing a non-actuated position of said receiver-relay means in the control of said circuit-interrupter means.

30. Protective relaying equipment for effecting a control of line-sectionalizing circuit-interrupter means for a transmission line-section, comprising, at each end of the line-section being protected, means for providing a communicating channel between the two ends of the protected line-section, transmitter-means capable of transmitting a signalling current into said communicating channel, receiver-relay means for receiving signalling currents which have been transmitted into said communicating channel, said receiver-relay means being normally biased towards a non-actuated condition, directional relay-means having directionally responsive means for developing an actuating force in response to current-flow into the protected line-section and a restraining force in response to current-flow from the protected line-section, said directional relay-means being normally biased towards a non-actuated condition, means responsive to a fault-condition accompanied by an actuated condition of said directional relay-means for quickly preventing the transmission of a signalling current into said communicating channel at that end of the protected line-section, means responsive, after a time-delay, to a fault-condition accompanied by a non-actuated condition of said directional relay-means, for thereafter interposing an impediment to any immediate quick prevention of signal-current transmission into the communicating channel at that end of the protected line-section, and means for utilizing said receiver relay means in the control of said circuit-interrupter means.

31. Protective relaying equipment for effecting a control of line-sectionalizing circuit-interrupter means for a transmission line-section, comprising, at each end of the line-section being protected, means for providing a communicating channel between the two ends of the protected line-section, directional relay-means having directionally responsive means for developing an actuating force in response to current-flow into the protected line-section and a restraining force in response to current-flow from the protected line-section, said directional relay-means being normally biased towards a non-actuated condition, fault-responsive means for quickly transmitting a signalling current into said communicating channel, receiver-relay means for receiving signalling currents which have been transmitted into said communicating channel, said receiver-relay means being normally biased towards a non-actuated condition, means responsive to a fault-condition accompanied by an actuated condition of said directional relay-means for quickly preventing the transmission of a signalling current into said communicating channel at that end of the protected line-section, means responsive, after a time delay, to a fault-condition, accompanied by a non-actuated condition of said directional relay-means for thereafter interposing an impediment to any immediate quick prevention of signal-current transmission into the communicating channel at that end of the protected line section, and means for utiliziing said receiver-relay means in the control of said circuit-interrupter means.

32. Protective relaying equipment for effecting a control of line-sectionalizing circuit-interrupter means for a transmission line-section, comprising internal-fault direction relay-means having directionally responsive means for developing an actuating force in response to current-flow into the protected line-section and a restraining force in response to current-flow from the protected line-section, said internal-fault directional relay-means also having a normally effective means tending to inhibit its operation, fault-responsive means for quickly relieving said normally effective inhibition, means for obtaining an external-fault directional response to faults accompanied by current-flow from the protected line-section, said last-mentioned means comprising means responsive after a time delay, to a fault-condition, accompanied by a non-actuated condition of said internal-fault directional relay-means, and means for utilizing said various responses in the control of said circuit-interrupter means.

33. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, said receiver-relay means being biased towards a non-actuated condition, means independent of the received signalling currents for causing said receiver-relay means to be normally restrained in an actuated condition during times when there are no signalling currents transmitted into said communicating channel, means, responsive selectively to fault-conditions which are accompanied by current-flow from the protected line-section, for causing the effective operation of said transmitter-means during a time when relaying operations are in process, and for restoring the ineffective condition of the transmitter-means after the cessation of fault-conditions, and for maintaining said transmission of signal-current for a predetermined time after any sudden reversal of current-flow direction during a continuance of said fault-conditions, means responsive at least to faults within the protected line-section for rendering ineffective the normally operative restraining means of the receiver-relay means, and means for utilizing a non-actuated condition of said receiver-relay means in the control of the circuit-interrupter means.

34. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line-section, means at said other end responsive to faults accompanied by current-flow direction out of the protected line-section at that end for causing the effective operation of said transmitter means during a time when the circuit-interrupter operation should be blocked, normally inactive circuit-interrupter operating means at the first-mentioned end including an electro-magnetic receiver relay having a tripping position and a non-tripping position, holding means effective during normal times when there is no effective signal-current and when there is no fault on the transmission line for normally holding the receiver relay in its non-tripping position, trip-position means in addition to said holding means and tending, when effectively operative, to cause said receiver relay to move to its tripping position, said trip-position means including a normally deenergized electric-circuit and relay-coil combination and means for energizing the same only in accordance with a predetermined manner of response to an actual fault-condition on the transmission line, and electro-responsive means including a normally deenergized electric-circuit and relay-coil combination which is energized only in response to an effective received signal-current for blocking the movement of the receiver relay to its tripping position.

35. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line section, means at said other end responsive to faults accompanied by current-flow direction out of the protected line-section at that end for causing the effective operation of said transmitter means during a time when the circuit-interrupter operation should be blocked, normally inactive circuit-interrupter operating means at the first-mentioned end-including a receiver relay having a tripping condition and a normal non-tripping condition, normally ineffective trip-condition means tending, when effectively operative, to cause said receiver relay to change to its tripping condition, means responsive to an effective received signal-current for restraining the change of said receiver relay to its tripping condition, and additional means independent of the signal-current for selectively responding to faults accompanied by current-flow direction into the protected line-section and for rendering said trip-condition means effective in the absence of said blocking action.

36. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line-section, means at said other end responsive to faults accompanied by current-flow direction out of the protected line-section at that end for causing the effective operation of said transmitter means during a time when the circuit-interrupter operation should be blocked, normally inactive circuit-interrupter operating means at the first-mentioned end including an electro-magnetic receiver relay having a tripping position and a non-tripping position, holding means effective during normal times when there is no effective signal-current and when there is no fault on the transmission line for normally holding the receiver relay in its non-tripping position, trip-position means in addition to said holding means and tending, when effectively operative, to cause said receiver relay to move to its tripping position, said trip-position means including a normally deenergized electric-circuit and relay-coil combination and means for energizing the same only in accordance with a predetermined manner of response to current-flow direction into the line-section, and electro-responsive means including a normally deenergized electric-circuit and relay-coil combination which is energized only in response to an effective received signal-current for blocking the movement of the receiver relay to its tripping position.

37. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line-section, means at said other end responsive to faults accompanied by current-flow direction out of the protected line-section at that end for causing the effective operation of said transmitter means during a time when the circuit-interrupter operation should be blocked, normally inactive circuit-interrupter operating means at the first-mentioned end including an electro-magnetic receiver relay having a tripping position and a non-tripping position, holding means effective during normal times when there is no effective signal-current and when there is no fault on the transmission line for normally holding the receiver relay in its non-tripping position, trip position means in addition to said holding means and tending, when effectively operative, to cause said receiver relay to move to its tripping position, said trip-position means including a normally deenergized electric-circuit and relay-coil combination and means for energizing the same only in accordance with a predetermined manner of response to an actual fault-condition on the transmission line accompanied by current-flow direction into the protected line-section, and electro-responsive means including a normally deenergized electric-circuit and relay-coil combination which is energized only in response to an effective received signal current for blocking the movement of the receiver relay to its tripping position.

38. Protective relaying equipment for effecting a control of line-sectionalizing circuit-interrupter means for a transmission-line section, comprising, at each end of the line-section being protected, normally inactive transmitter means for transmitting a signal-current from its end to the other end of the line-section, normally inactive circuit-interrupter operating means including an electro-magnetic receiver relay having a tripping position and a non-tripping position, holding means effective during normal times when there is no effective signal-current and when there is no fault on the transmission line for normally holding the receiver relay in its non-tripping position, trip-position means in addition to said holding means and tending, when effectively operative, to cause said receiver relay to move to its tripping position, said trip-position means including a normally deenergized electric-circuit and relay-coil combination, and electro-responsive means including a normally deenergized electric-circuit and relay-coil combination which is energized only in response to an effective received signal-current for blocking the movement of the receiver relay to its tripping position, fault-responsive means operative, in the absence of other inhibitions, to remove an impediment against the effective operation of said transmitter means and to energize said normally deenergized electric-circuit and relay-coil combination of said trip-position means, said fault-responsive means being responsive by an operative change in its condition as a result of faults on the transmission line, and directionally responsive means operative, in the absence of other inhibitions, to interpose an impediment against the effective operation of the transmitter means, said directionally responsive means being responsive by an operative change in its condition as a result of current-flow direction into the protected line-section.

39. Protective relaying equipment for effecting a control of line-sectionalizing circuit-interrupter means for a transmission line-section, comprising, at each end of the line-section being protected, means for providing a communicating channel between the two ends of the protected line-section, transmitter-means capable of transmitting a signalling current into said communicating channel, receiver-relay means for receiving signalling currents which have been transmitted through said communicating channel, said receiver-means having a tripping condition and a normal non-tripping condition, directional relay-means having directionally responsive means for developing an actuating force in response to current-flow into the protected line-section and a restraining force in response to current-flow from the protected line-section, said directional relay-means being normally biased towards a non-actuated condition, means responsive to a fault-condition accompanied by an actuated condition of said directional relay-means for blocking the transmission of a signalling current into said communicating channel at that end of the protected line-section, means responsive, after a time-delay, to a fault-condition accompanied by a non-actuated condition of said directional relay-means, for thereafter interposing an impediment against any immediate blocking of signal-current transmission into the communicating channel at that end of the protected line-section, and means for utilizing said receiver-relay means in the control of said circuit-interrupter means.

40. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line-section, fault-responsive means at said other end for quickly initiating the transmission of said signal-current at said other end, internal directional means at said other end for blocking the transmission of said signal-current at said other end when there is a predetermined current-flow in a direction into the protected line-section at said other end, means responsive, after a time-delay, to a fault-condition accompanied by a non-actuated condition of said internal directional means at said other end, for thereafter interposing an impediment against any immediate blocking of signal-current transmission into the communicating channel at said other end of the line section, and normally inactive circuit-interrupter operating means at the first-mentioned end of the line-section including a receiver relay having a tripping condition and a normal non-tripping condition, normally ineffective trip-condition means tending, when effectively operative, to cause said receiver relay to change to its tripping condition, means responsive to an effective received signal-current for blocking the change of said receiver relay to its tripping condition, and means responsive in a predetermined manner to faults on the transmission line for rendering said trip-condition means effective in the absence of said blocking action.

41. Protective relaying equipment for effecting a control of line-sectionalizing circuit-interrupter means at one end of a transmission-line section, comprising normally ineffective transmitter means at the other end of the line-section for transmitting a signal-current from its end to the first-mentioned end of the line-section, fault-responsive means at said other end for quickly initiating the transmission of said signal-current at said other end, internal directional means at said other end for blocking the transmission of said signal-current at said other end when there is a predetermined current-flow in a direction into the protected line-section at said other end, means responsive, after a time-delay, to a fault-condition accompanied by a non-actuated condition of said internal directional means at said other end, for thereafter interposing an impediment against any immediate blocking of signal-current transmission into the communicating channel at said other end of the line-section, and normally inactive circuit-interrupter operating means at the first-mentioned end of the line-section including an electro-magnetic receiver relay having a tripping position and a non-tripping position, holding means effective during normal times when there is no effective signal-current and when there is no fault on the transmission line for normally holding the receiver relay in its non-tripping position, trip-position means in addition to said holding means and tending, when effectively operative, to cause said receiver relay to move to its tripping position, said trip-position means including a normally deenergized electric-circuit and relay-coil combination and means for energizing the same only in accordance with a predetermined manner of response to an actual fault-condition on the transmission line, and electro-responsive means including a normally deenergized electric-circuit and relay-coil combination which is energized only in response to an effective received signal-current for blocking the movement of the receiver relay to its tripping position.

42. Protective relaying equipment for effecting a control of line-sectionalizing circuit-interrupter means for a transmission line-section, comprising, at each end of the line-section being protected, means for providing a communicating channel between the two ends of the protected line-section, directional relay-means having directionally responsive means for developing an actuating force in response to current-flow into the protected line-section and a restraining force in response to current-flow from the protected line-section, said directional relay-means being normally biased towards a non-actuated condition, fault-responsive means for quickly transmitting a signalling current into said communicating channel, means responsive to a fault-condition accompanied by an actuated condition of said directional relay-means for blocking the transmission of signalling current at its end of the protected line-section, means responsive, after a time delay, to a fault-condition, accompanied by a non-actuated condition of said directional relay-means for thereafter interposing an impediment to any immediate quick prevention of signal-current transmission into the communicating channel at that end of the protected line section, receiver-relay means having a tripping condition and a non-tripping condition, restraining means effective during normal times when there is no effective signal-current and when there is no fault on the transmission line for normally restraining the receiver relay in its non-tripping condition, trip-condition means in addition to said restraining means and tending, when effectively operative, to cause said receiver relay to change to its tripping condition, means responsive to an effective signal-current received from the other end of the protected line-section for restraining the change of said receiver relay to its tripping condition, and means responsive in a predetermined manner to faults on the transmission line for rendering said trip-condition means effective in the absence of said blocking action.

43. Protective relaying equipment for effecting a control of line-sectionalizing circuit-interrupter means for a transmission line-section, comprising, at each end of the line-section being protected, means for providing a communicating channel between the two ends of the protected line-section, normally ineffective transmitter-means for transmitting a signalling current into said communicating channel, receiver-relay means for receiving and responding to all signalling currents which have been transmitted into said communicating channel from either or both ends thereof, means other than the received signalling currents for causing said receiver-relay means to be normally restrained in a non-tripping condition during times when there are no signalling current transmitted into said communicating channel, means responsive to an effective received signalling current for restraining said receiver-relay means in a non-tripping condition, means, responsive selectively to fault-conditions which are accompanied by current-flow from the protected line-section, for causing the effective operation of said transmitter-means during a time when relaying operations are in process, and for maintaining said transmission of signal-current for a predetermined time after any sudden reversal of current-flow direction during a continuance of said fault-conditions, means responsive at least to faults within the protected line-section for causing the receiver-relay means to assume a tripping condition in the absence of an effective received signalling current, and means for utilizing the tripping condition of said receiver-relay means in the control of the circuit-interrupter means.

MAURICE E. REAGAN.